Dec. 4, 1928.

H. P. HANSON

FLOWERPOT HOLDER

Filed April 1, 1926

1,693,896

Inventor
Hans Peter Hanson
By Winfield D. Williams
Atty.

Patented Dec. 4, 1928.

1,693,896

UNITED STATES PATENT OFFICE.

HANS PETER HANSON, OF CHICAGO, ILLINOIS.

FLOWERPOT HOLDER.

Application filed April 1, 1926. Serial No. 99,067.

My invention relates to an attachable and demountable handle for vessels and receptacles having a definite form of flanged rim, and more specifically it relates to various types of flower pots generally used in the florist's trade.

The primary objects of my invention are to provide a very simple and economical device of the character described having certain resilient characteristics which adapt it to be quickly placed upon a flower pot without requiring any skill or manipulation; which provides broad frictional surfaces with a single wire; which operates with certain cooperating characteristics causing it to automatically adjust itself to various sizes of rims; and which will cling to the pot and tend to increase the grip as the tension upon the handle is increased. Secondary objects will appear to one conversant with the art.

This application is a modification of and improvement upon my former application S. N. 748,216, filed Nov. 6, 1924. An illustrative embodiment of my invention is shown in the accompanying drawings, in which Fig. 1 is an elevation of a flower pot with the handle attached thereto, the upper or bow part of the handle being cut away.

Figure 1:
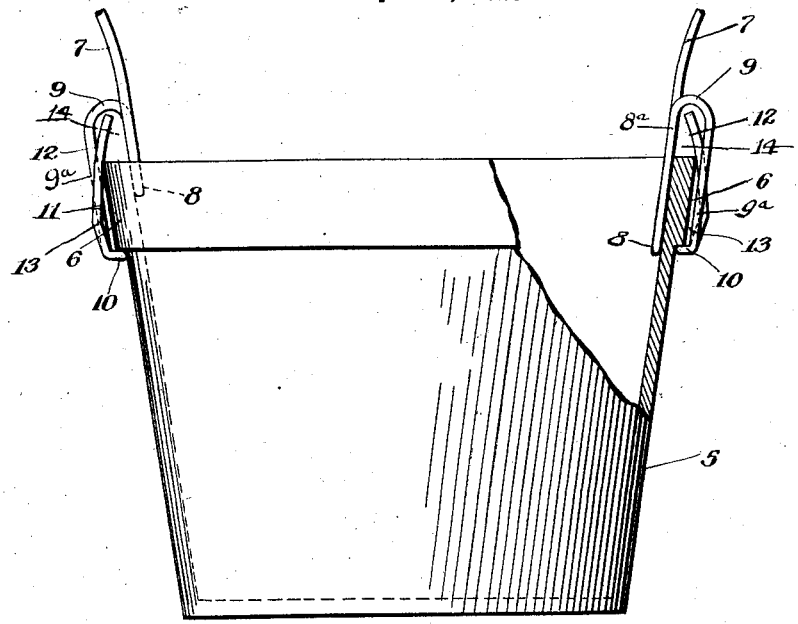
Figures 2, 3:
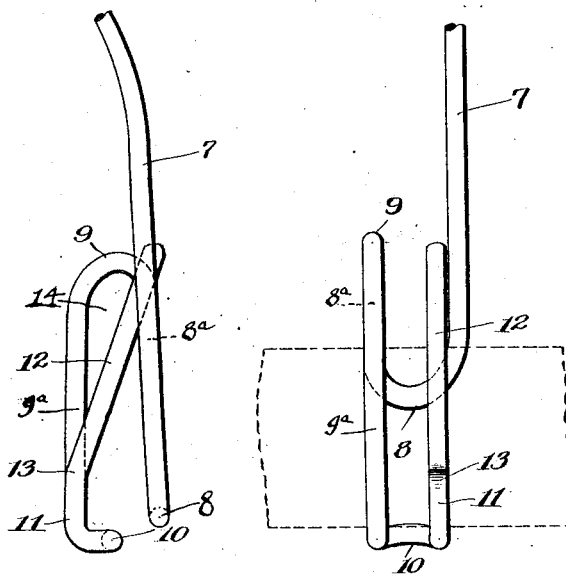
Fig. 2 is a detailed side view of one of the end formations of the handle.
Fig. 3 is a front view of one handle end showing its relation to a pot rim indicated in dotted outline.

Primarily the device is constructed of a single piece of wire, and the wire is of a character having certain resiliency but of sufficient firmness to have the constant tendency to maintain a predetermined form and a tendency to return to that form when released from external strain; in reference to the character of the material it is to be noted that I specify resilient in contrast to material in the handle which is practically dead—having no resilient quality and whose tendency is to remain in any form in which it might be placed, or when removed therefrom. Although the illustrations show only the end portions of a handle it is to be understood that these portions are the end or terminal portions of a single continuous wire handle 7 formed into a bow shape as more fully shown in my former application herein referred to. This structure with its end portions in association with a flower pot and tensionally operating therewith, grippingly attaches to the flower pot and is only removable by manual effort. As illustrated the said handle 7 consists of a bow portion and a grip portion on each end thereof formed substantially as follows: the handle 7 is bent into a loop portion 8 and a return portion 8A lying substantially parallel to the body of the handle and is designed to lie adjacent the inside of the pot 5—the length and breadth of this loop being variable; the return portion 8A being again formed into a loop 9 substantially at right angles to the loop 8 its extended portion 9A spaced apart from the loop 8 and in a substantially parallel plane forming a pair of legs adapted to straddle the edge of a flower pot or similar vessel; the portion 9A extended from loop 9 is again formed into a loop 10 whose extended portion 11 would normally be substantially in the same plane as the body portions 7, 8A and 9A. The loop 10 I bend at right angles to the portions 9A and 11—inwardly turned toward the body portion of the handle 7—forming in conjunction with the body portion 7 and looped portions a partially enclosed area 14. The body portion 11 being a continuation of the loop 10 is bent at 13 into a portion 12 adapted to cross the partially enclosed area 14 at an oblique angle and stand in a more or less tensional locking position in relation to the looped portion 8 and the looped portion 10.

The loop created by 8 and 8A has length and breadth adapted to the amount of friction desired, the basic principle being the production of an adequate frictional bearing surface from a single wire; further it will be observed that in the loop portion 8 I first secure a tension quality wherein a strain on the bow 8 will tend to draw the loop portion 8 into close contact with the inside of the flower pot 5, and a strain at loop 10 tends to draw the loop 8 and portion 8A into closer gripping relation on the inner edge of the flower pot 5; and it will be observed that such a strain at loop 10 and any increase thereof by reason of the resiliency at loop 9 will tend to force the inwardly bent loop 10 into a closer locking relation under the rim or ledge of the flange 6 of the flower pot 5. The action of the portion 12 obliquely bent at 13 and crossing the partially enclosed area 14 is to stress these loop portions and to automatically adjust the end grips to various sizes of pot flanges. It will be observed that this device when attached to a flower pot is adapted to automatically take a substantially rigid position upon the pot and independently support itself in an upright position; and I provide a structure which has in it certain combined tensional qualities which adapt it to easy attachment, automatic adjustment, permanency of grip, and simplicity of demountability.

In operation, the device is brought to the edge of the flower pot and the open portion of the partly enclosed area straddled over the edge of the pot 5. A normal slight pressure downwardly causes the obliquely bent portion 12 to yield until the inwardly bent loop portion 10 arrives at a point where it automatically snaps under the edge of the flange 6 of the flower pot. This device is automatic, self-adjusting to the varying size rims of commercial flower pots; the partially enclosed spaced area being sufficient to permit of the variations and the tensional adjusting portion automatically taking up any variation in the size of the flange of the flower pot. It will be further observed that the structure as described tends at each point to increasingly grip the flower pot as the lifting strain upon the handle tends to act upon the grips and any increased pressure upon the automatic tension member tends to force the inwardly bent loop 10 into closer gripping relation under the flange 6 of the flower pot. A slight lateral pressure inwardly upon the handle 7 uses the loop 8 as a fulcrum and serves to release the loop 10 from under the flange of the pot whence it is easily demounted.

Large bearing surfaces out of a single wire, simplicity of construction, simplicity of application and simplicity of demountability are major factors in the construction and operation; the automatic spacer for adjustment to all kinds of pot flanges is a vital factor in this device. A handle could be devised where a plurality of parts might be made to accomplish some of these ends, but in this device all of these factors are present and all of the ends accomplished; the holding power of this handle is so great that the wire would be almost straightened out before its grip upon the pot would be affected.

I do not limit myself to the structure as shown, or described in the specification thereof, other than as I am limited by the scope of the claims.

Claims—

1. In a device of the character described, a demountable pot handle consisting of a single piece of resilient wire formed to straddle the flanged rim of a pot, there being means for locking itself to the said pot flange, and means to automatically vertically adjust its locking mechanism to variant pot flanges.

2. A handle adapted to grip the flanged rim of a pot, said handle consisting of a resilient metal rod, being a bow form having each end formed to attach to opposite sides of the flanged rim of a pot; the said ends being so formed as to straddle the flanged rim of a pot, and means to resiliently adjust vertically each end to the said flower pot flange and resiliently demountably lock it thereto.

3. A handle of the character described constructed of a single piece of resilient wire adapted to grip a pot internally at the rim and externally under the flange, the said holder being a bow form having each end formed to attach to opposite sides of the flanged rim of a pot; the said ends being so formed as to straddle the flanged rim of a pot and to be resiliently adjusted to the vertical depth of the flange of said pot and resiliently locked thereto.

4. A potholder comprising a resilient bow member having terminal grip portions adapted to attach to a pot at opposite sides of the flanged rim, each of said grips being formed by bending one of the terminal portions into approximately inverted U-shaped portions as downwardly directed legs to straddle the flange of a flower pot; each of said grip portions having on its outer leg an inwardly bent portion adapted to pass under the ledge of the flower pot flange, and a terminal portion adapted to automatically vertically adjust the grips to the flange of the flower pot and tensionally lock the said gripping portions to the flower pot.

5. A device for the purposes described comprising a bow member having terminal grips to straddle and engage the flanged rim of a pot, each of said grips comprising mainly a downwardly facing top hook part to receive the upper edge of the rim and an upwardly facing bottom hook part inwardly bent adapted to clutch under the ledge of the flanged rim, and a resilient free end having means whereby to vertically adjust the gripping members and tensionally maintain the grip.

6. A device for the purposes described comprising a bow member having terminal grips adapted to straddle and engage the flanged rim of a pot, each of said grips comprising mainly a downwardly facing top hook part to receive the upper edge of the rim and an upwardly facing bottom hook part inwardly bent adapted to clutch under the ledge of the flanged rim, and a resilient free end having means whereby to urge the locking member under the lower ledge of the flange and coactively increase the contact of the portion bearing upon the inside of the pot, and automatically adjust the gripping members to the vertical depth of the flanged rim.

7. An article of manufacture for the purposes described formed from a strip of resilient metal each of its ends bent to form a substantially rectangular area one of whose sides is partially open adapted to form an entrance opening for the flanged rim of a flower pot, one of the sides of said area enclosing portion adapted to grip under the ledge of the flower pot flange, the terminal portion of said handle obliquely crossing the said enclosed area, thereby forming a resilient self-adjusting means for rigidly holding the said gripping member to the flower pot.

8. An article of manufacture for the purposes described consisting of a single strip of resilient metal, each of its ends being bent to form a pair of legs wherewith to straddle the flanged rim of a vessel, one of each said pair of legs terminating in an inwardly bent loop, extending from each of said inwardly bent loops a terminal portion adapted to act upon its associated leg members and automatically adjust vertically the gripping ends to the vessel.

9. An article of manufacture for the purposes described consisting of a single strip of metal, each of its ends being bent to form a pair of legs wherewith to straddle the flanged rim of a vessel, the outer of each said pair of legs terminating in an inwardly bent loop, extending from each said inwardly bent loop a tensional portion co-acting with the straddle legs adapted to securely vertically lock the leg portions to the vessel and automatically take up any variation in the size of the flanged rim of the vessel.

10. An article of manufacture for the purposes specified comprising wire consisting of a bow portion each end thereof formed into terminal grips, each of said terminal grips being adapted to be attachingly associated with the rim and flange of a flower pot; a resilient means whereby said terminal grips are held in gripping position and are automatically tensionally adjusted vertically and laterally to the flanged rim of the flower pot.

11. A handle of the character described comprising a body with terminal grips formed as follows: a portion of the body being bent to form an upwardly directed loop at a point slightly remote from the end of the body, then looped again downwardly in a direction substantially at right angles to the first loop forming a spaced area between the first loop and the downwardly extending portion, adapted to form legs wherewith to straddle the rim of a vessel having a flanged rim thereon; the downwardly directed portion being again formed into a loop with an upwardly extended portion in the same plane as the downwardly extended portion; the outer lower loop being bent inwardly at right angles and forming a lug adapted to rest under the ledge of the vessel rim; an upwardly extended portion inwardly bent at an angle across the spaced area and adapted to form a resilient resistance upon the edge of the pot rim and automatically limit the travel of the gripping members downward and automatically adjust the attaching device to the pot.

12. An article of manufacture for the purpose specified comprising wire consisting of a bow portion on each end thereof formed into terminal grips, each of the said grips being adapted to be grippingly associated with the rim and flange of a flower pot; the inner member of each of the said terminal portions being looped with a return portion adapted to secure multiplied frictional surface contact with the inner wall of a flower pot, the outer terminal portion having an inwardly bent portion adapted to bear under the flange of the flower pot rim; means to automatically vertically adjust the grip to depth of the flange of the pot.

13. An article of manufacture comprising a demountable handle to a vessel consisting of wire so formed that it comprises a bow portion, there being an attaching means at either end of the bow portion; each said attaching means consisting of a pair of frictional members adapted to act against the inside walls and the outside flange of the vessel; each of the frictional members comprising means to secure broad multiplied bearing surface from wire; means to automatically adjust the grips to the depth of the flange of the vessel.

Signed at Chicago, Illinois, Mar. 23rd, 1926.

HANS PETER HANSON.